Oct. 22, 1935.  E. J. BLISS  2,018,630
FOOT MEASURING MACHINE
Filed April 6, 1933
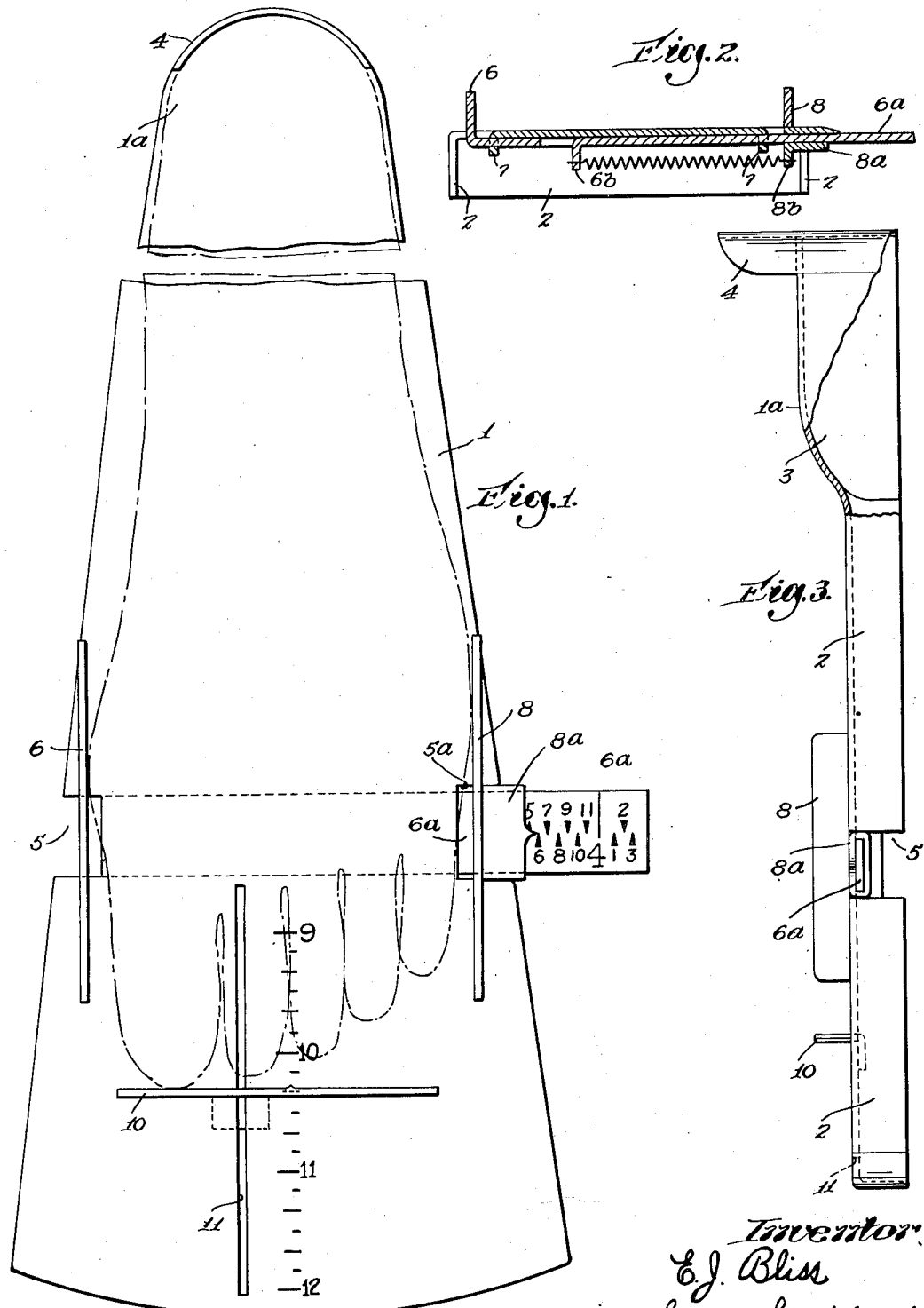
Inventor
E. J. Bliss
by Geo. N. Goddard
Attorney Patented Oct. 22, 1935

2,018,630

UNITED STATES PATENT OFFICE 2,018,630

FOOT MEASURING MACHINE

Elmer J. Bliss, Boston, Mass., assignor to Regal Shoe Company, Whitman, Mass., a corporation of Massachusetts Application April 6, 1933, Serial No. 664,716

4 Claims. (Cl. 33—3)

This invention relates to the measuring of human feet and is intended to provide a simple, inexpensive and thoroughly reliable device by which both the right and the left foot can be accurately measured by direct reading, giving both length dimensions and width dimensions of the foot supported on the machine to carry the weight of the person so that the foot will be measured in expanded or extended posture.

It has been customary in the shoe art to use certain arbitrarily selected symbols, either numerals or letters, for indicating, respectively, the length-size and the width-size of shoes and in the patent issued to me August 15, 1922, No. 1,426,143 I have devised a foot measuring machine for giving the readings in the commonly accepted length and width size symbols in which were used divergent ball gauges which diverged at a predetermined angle to compensate for the increase in width masurement that has been commonly associated with each increase of unit of length measurement and such machines have proved very successful in practice.

It is the object of the present invention to provide an accurate means for quickly ascertaining the absolute length and width measurements of the foot by direct reading so as to avoid confusion due to the fact that in actual practice among different last makers and shoe makers there have been introduced many variations of, or departures from, standard measurements so that the old size measurements marked on shoes, such for example as 7—C, might mean quite a variety of absolute dimensions of lasts and of shoes.

The present invention embraces a foot supporting standard which may readily be made of pressed metal for the sake of cheapness and lightness and which, in addition to the fixed heel gauge and slidable length measuring toe gauge, has two parallel side gauges slidably supported by the base and movable transversely of the interposed foot to form gauging contact therewith, one of said ball gauging members being provided with a measuring scale, while the other member in coordination therewith serves as a pointer or indicator for indicating the width measurement of the interposed foot. These and other features of the invention will be described in the following specification and will be defined in the claims hereto annexed.

In the drawing I have llustrated a simple and effective form of construction embodying the principles of this invention, in which Fig. 1 is a plan view of the foot measuring device showing the relation of the measuring gauges to the foot whose outline is shown in dotted lines.

Fig. 2 is a transverse section through the medial line of the ball measuring gauges.

Fig. 3 is a side elevation on a reduced scale of the device shown in Fig. 1.

In the practice of the invention according to the form illustrated, I provide a foot supporting base member or platform 1, which may be made of pressed metal and whose peripheral marginal portions are bent downward to form supporting flanges 2 to raise the platform slightly above the floor. The rear portion of the platform, which is to support the heel, is somewhat raised or elevated, as shown at 1ª, and is preferably supported by a block 3 above the level of the forepart of the platform.

At the rear end the metal is upturned to form a heel gauging flange or member 4 with which the heel of the foot being measured should always contact.

Preferably, in order to avoid making the forepart too narrow for forming adequate support for a large size foot, the platform is provided with inwardly extending notches or recesses 5 about midway the ends of the parallel side gauges 6 and 8.

The side gauge 6 is formed with a downwardly and horizontally extending tongue 6ª which is much narrower than the length of the upstanding gauge member 6 itself. This relatively narrow tongue is supported in horizontal slots or openings formed in downwardly extending supported flanges 7, which in this case are formed by bending down the edge portions of the metal subtending the inner edges of the recess 5, 5ª. The opposing side gauge comprises the upstanding member 8, whose lower edge at its middle is formed with an offset horizontal extension 8ª bent in the form of a loop to embrace loosely the adjacent portion of the tongue 6ª, which passes through the loop, so that the tongue 6ª forms a support for the gauge member 8 which is slidable on said tongue and which permits the tongue to slide independently of the gauge 8. Thus the two parallel opposed side gauges are independently movable toward and away from each other to form gauging contact with the opposite sides of the ball portion of the foot. The gauges 6 and 8 are made of sufficient length longitudinally to properly gauge the ball portions of feet of any desired range of length.

On one of the side gauge members is provided a width measuring scale laid out in inches and fractions thereof with the scale marks separated by intervals of one-twelfth inch which, generally speaking, is the increment or unit of ball measurement of the human foot, which is based on variations in girth measurements at the ball.

The range of men's sizes in actual width measurements covers measurements from a fraction over three inches to a fraction over four inches and, consequently the scale marks inside of the four inch line are laid off and numbered according to one-twelfth of an inch and those on the outside of the four inch mark are similarly laid off, so that when the edge portion of the member 8ª of the gauge 8 registers with any one of the scale marks the indicator gives a direct reading of the absolute width measurement of the ball of the foot being measured. For convenience, I have provided the outer edge of the member 8ª with a tip or pointer but the straight edge itself might equally well be used to register the actual width measurement of an interposed foot.

Obviously the ball gauges might be pressed against the foot by the one making the measurement, but as the foot is readily compressible different degrees of pressure would be likely to register different actual measurements. Therefore, in order to obtain substantial uniformity the tongue 6ª is provided with a downwardly struck flange 6ᵇ and the scale member 8ª is provided with a similar downwardly struck flange 8ᵇ and these are connected by a contractile spring which acts to draw the respective gauges into gauging contact with the foot with a substantially uniform pressure.

An upstanding toe gauge 10 extending transversely of the forepart is mounted to slide along a longitudinal slot 11 to gauge against the tip of the great toe and one end travels along a length measuring scale, so that the length of the foot, when expanded under the weight of the person, is accurately ascertained.

As all the parts can be readily made of pressed steel or other metal, the device can be made and assembled at very low cost, thus promoting its extensive use for the purpose of giving absolutely accurate and reliable foot measurements. This is a matter of great importance because so many last makers and shoe makers have departed from theoretical standards of measurement in size marking their lasts and their shoes, that a great deal of confusion and uncertainty has been introduced into the art because the same size designations, according to this confusing practice, may be and are applied to shoes, thus leading to a very considerable degree of misfitting of shoes, which is a prolific source of foot troubles.

What I claim is:

1. A foot measuring device embracing a foot supporting base having a longitudinally slidable toe gauge associated with a length measuring scale on said base, and transversely movable parallel side gauges in telescopic engagement one with the other, each capable of movement independently of the other toward and from the ball portions of an interposed foot, one of said side gauges being provided with a width measuring scale laid out at intervals equal to the unit of ball width measurement and in association with identifying numerals, the opposite gauge being provided with a coordinated indicating member for indicating on said scale the actual width measurement of an interposed foot.

2. A foot measuring device embracing a foot supporting base provided with transversely movable parallel side gauges, one slidably mounted upon the other, each capable of movement independently of the other toward and away from the ball portions of the foot, one of said side gauges being provided with a width measuring scale laid out at intervals equal to the unit of ball width measurement and in association with identifying numerals, the opposite gauge being provided with a coordinated indicating member for indicating on said scale the width measurement of an interposed foot, and means normally tending to draw said opposed gauges into gauging contact with opposite sides of the ball portion of the interposed foot.

3. A foot measuring device embracing in its construction a foot supporting platform of sheet metal having its marginal portions turned downwardly to form supporting flanges to raise the platform from the floor and having on opposite sides of its forepart inwardly extending recesses, opposed parallel side gauging members, one of which is provided with a supporting tongue extending across the forepart in alignment with said recesses, the other member being provided with a supporting loop slidingly embracing the outwardly projecting portion of said tongue, the tongue being provided with a width measurement scale along which the loop portion travels to indicate the actual width measurement of the ball of an interposed foot.

4. A foot measuring device embracing a raised platform provided with downwardly turned perforated guide members forming laterally spaced bearing members, opposed transversely movable side gauging members extending longitudinally in parallelism, with each other, one of said gauges being provided with a relatively narrow tongue extending transversely through said bearing members and beyond the opposite side of the base and forming a support for the other side gauging member, a retractile spring interconnecting the two gauge members to yieldingly draw them toward each other, one of said members being provided with a width measuring scale and the other serving as an indicator registering with said scale to indicate the width measurment of the interposed foot.

ELMER J. BLISS.